United States Patent
Yamashita

(10) Patent No.: US 6,646,213 B2
(45) Date of Patent: Nov. 11, 2003

(54) ACCELERATION DETECTOR WITH HIGH RESPONSE SENSITIVITY

(75) Inventor: Toshiyuki Yamashita, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 10/146,068

(22) Filed: May 16, 2002

(65) Prior Publication Data

US 2003/0089169 A1 May 15, 2003

(30) Foreign Application Priority Data

Nov. 14, 2001 (JP) .................................... 2001-349182

(51) Int. Cl.⁷ ............................................. H01H 35/14
(52) U.S. Cl. .................................. 200/61.53; 200/61.45
(58) Field of Search ...................... 200/61.53, 61.45 M, 200/61.48, 61.41–61.44, 61.4, 61.45 R, 61.5; 307/117–121; 340/669–670

(56) References Cited

U.S. PATENT DOCUMENTS

| 4,161,228 A | * | 7/1979 | Svensson et al. ......... 200/61.53 |
| 5,581,060 A | * | 12/1996 | Kobayashi et al. .. 200/61.45 M |
| 5,585,607 A | * | 12/1996 | Kato et al. ................ 200/61.53 |
| 5,793,006 A | * | 8/1998 | Asada ...................... 200/61.53 |
| 5,801,348 A | * | 9/1998 | Asada ...................... 200/61.53 |
| 5,845,729 A | * | 12/1998 | Smith et al. ................. 180/282 |
| 6,455,791 B1 | * | 9/2002 | Yamashita et al. ....... 200/61.53 |

FOREIGN PATENT DOCUMENTS

| JP | 5-242776 | 9/1993 |
| JP | 9-113532 | 5/1997 |
| JP | 9-211023 | 8/1997 |

\* cited by examiner

*Primary Examiner*—Elvin Enad
*Assistant Examiner*—M. Fishman
(74) *Attorney, Agent, or Firm*—Sughrue Mion, PLLC

(57) ABSTRACT

An acceleration detector including a mass member and a fixed contact, which keep contact with each other by an elastic member that presses the mass member to the fixed contact. When a vehicle undergoes an impact from its left side in its traveling direction, for example, and the mass member receives inertial force that exceeds the pushing force of the elastic member, the mass member moves toward the elastic member, thereby separating from the fixed contact. By providing the mass member and the fixed contact on both sides of the elastic member, side-to-side impact applied to the vehicle can be detected. The acceleration detector with such a configuration can detect the impact acceleration at high response sensitivity and in both directions.

17 Claims, 12 Drawing Sheets

FIG.4
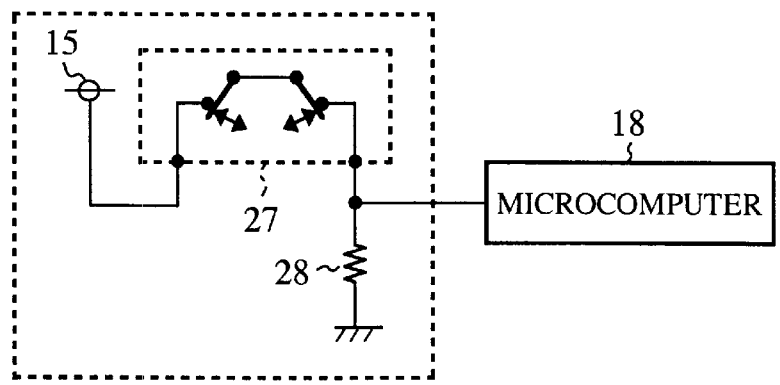
FIG.5A
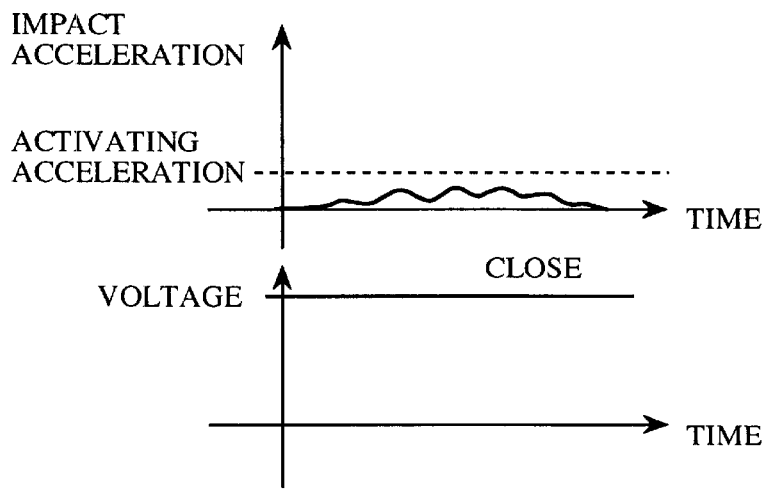
FIG.5B
FIG.6A
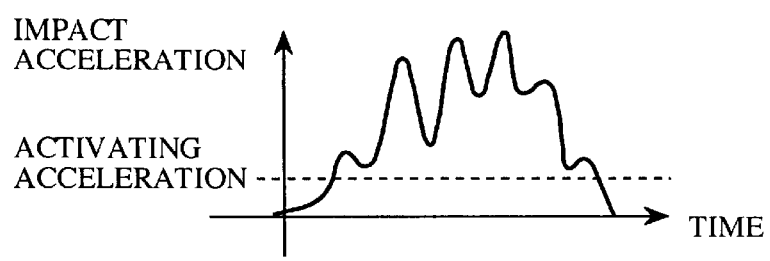
FIG.6B
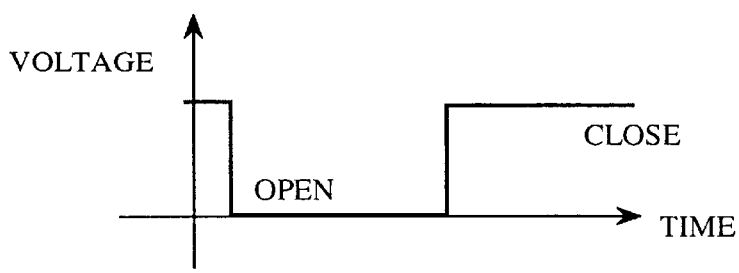

FIG.10

| STATE OF EACH MASS MEMBER | | STATE OF EACH FIXED CONTACT (INPUT TO MICROCOMPUTER) | | | CONTROL OF SEMICONDUCTOR SWITCHES | |
|---|---|---|---|---|---|---|
| MASS MEMBER 41 | MASS MEMBER 42 | 44-45 | 44-45a | 45-45a | RIGHT SIDE | LEFT SIDE |
| NO MOVE | NO MOVE | CLOSE | CLOSE | CLOSE | OPEN | OPEN |
| MOVE | NO MOVE | OPEN | OPEN | CLOSE | CLOSE | OPEN |
| NO MOVE | MOVE | OPEN | OPEN | OPEN | CLOSE | CLOSE |
| MOVE | MOVE | OPEN | CLOSE | CLOSE | | |
| NO CORRESPONDING STATE | | CLOSE | OPEN | OPEN | PROCESSING IN ABNORMAL MODE | |
| | | CLOSE | CLOSE | OPEN | | |
| | | CLOSE | OPEN | OPEN | | |

FIG. 13

| STATE OF EACH MASS MEMBER | | STATE OF EACH FIXED CONTACT (INPUT TO MICROCOMPUTER) | | | | | | CONTROL OF SEMICONDUCTOR SWITCHES | |
|---|---|---|---|---|---|---|---|---|---|
| MASS MEMBER 41 | MASS MEMBER 42 | 44-44a | 44-45 | 44-45a | 45-44a | 45a-44a | 45-45a | RIGHT SIDE | LEFT SIDE |
| NO MOVE | NO MOVE | CLOSE | CLOSE | CLOSE | CLOSE | CLOSE | CLOSE | OPEN | OPEN |
| MOVE | NO MOVE | OPEN | OPEN | OPEN | OPEN | OPEN | CLOSE | CLOSE | OPEN |
| NO MOVE | MOVE | CLOSE | OPEN | OPEN | OPEN | OPEN | OPEN | OPEN | CLOSE |
| MOVE | MOVE | OPEN | OPEN | OPEN | OPEN | OPEN | CLOSE | CLOSE | CLOSE |
| NO CORRESPONDING STATE | | CLOSE | 14 TYPES BESIDES (ALL OPEN AND ALL CLOSE) | | | | CLOSE | PROCESSING IN ABNORMAL MODE | |
| | | OPEN | 14 TYPES BESIDES (ALL OPEN AND ALL CLOSE) | | | | CLOSE | | |
| | | CLOSE | 14 TYPES BESIDES (ALL OPEN AND ALL CLOSE) | | | | OPEN | | |
| | | OPEN | 14 TYPES BESIDES (ALL OPEN AND ALL CLOSE) | | | | OPEN | | |
| | | OPEN | CLOSE | CLOSE | CLOSE | CLOSE | CLOSE | | |
| | | CLOSE | CLOSE | CLOSE | CLOSE | CLOSE | OPEN | | |
| | | OPEN | CLOSE | CLOSE | CLOSE | CLOSE | OPEN | | |
| | | CLOSE | OPEN | OPEN | OPEN | OPEN | CLOSE | | |

IMPACT ACCELERATION

IMPACT ACCELERATION

ACCELERATION DETECTOR WITH HIGH RESPONSE SENSITIVITY

BACKGROUND OF THE INVENTION

1. Field of the Invention

The present invention relates to an acceleration detector for detecting impact acceleration that exceeds reference acceleration for driving and controlling a vehicle occupant protection system.

2. Description of Related Art

FIG. 19 is a top view showing a vehicle occupant protection system such as an air bag system. In this figure, the reference numeral 1 designates the body of a vehicle; 2 designates an occupant protection system against right-side crashes, which is mounted on the right side in the vehicle in its traveling direction; and 3 designates an occupant protection system against left-side crashes, which is mounted on the left side in the vehicle in its traveling direction.

The reference numeral 4 designates a right-side collision sensor unit for detecting the impact in right side crashes; 5 designates a left-side collision sensor unit for detecting the impact in left side crashes; and 6 designates a controller mounted on the vehicle, for controlling the occupant protection system 2 against the right-side crashes and the occupant protection system 3 against the left-side crashes.

FIG. 20 is a block diagram showing an electrical configuration of the occupant protection system of FIG. 19. In this figure, the reference numeral 11 designates a semiconductor type right-side collision acceleration sensor for producing an electric signal proportional to the acceleration the vehicle undergoes on the right side in its traveling direction; and 12 designates a microcomputer that recognizes the acceleration from the electric signal supplied from the right-side collision acceleration sensor 11, and outputs a control signal for closing a semiconductor switch 19 when the acceleration exceeds impact acceleration (acceleration beyond reference acceleration). Likewise, the reference numeral 13 designates a semiconductor type left-side collision acceleration sensor for producing an electric signal proportional to the acceleration the vehicle undergoes on the left side in its traveling direction; and 14 designates a microcomputer that recognizes the acceleration from the electric signal supplied from the left-side collision acceleration sensor 13, and outputs a control signal for closing a semiconductor switch 20 when the acceleration exceeds the impact acceleration.

The reference numeral 15 designates a power supply; 16 designates a mechanical right-side collision acceleration sensor that is mounted inside a controller 6 for detecting the impact acceleration the vehicle undergoes on the right side in its traveling direction; and 17 designates a mechanical left-side collision acceleration sensor that is mounted inside the controller 6 for detecting the impact acceleration the vehicle undergoes on the left side in its traveling direction. The reference numeral 18 designates a microcomputer that outputs a control signal for closing a semiconductor switch 21 when the right-side collision acceleration sensor 16 detects the impact acceleration, and that outputs a control signal for closing a semiconductor switch 22 when the left-side collision acceleration sensor 17 detects the impact acceleration. Reference numerals 19–22 each designate a semiconductor switch. The reference 23 designates a driving circuit for driving an occupant protection system 24 when the semiconductor switches 19 and 21 are closed; and 24 designates the occupant protection system such as an air bag against the right-side crashes. Likewise, the reference numeral 25 designates a driving circuit for driving an occupant protection system 26 when the semiconductor switches 20 and 22 are closed; and 26 designates the occupant protection system such as an air bag against the left-side crashes.

Next, the operation of the conventional occupant protection system will be described.

For example, when another vehicle collides with the right side in the traveling direction of the vehicle, the right-side collision acceleration sensor 11 supplies the microcomputer 12 with the electric signal proportional to the acceleration applied on the right side of the vehicle. At the same time, the right-side collision acceleration sensor 16 detects the impact acceleration beyond the reference acceleration, and supplies the detection signal to the microcomputer 18.

Receiving electric signal from the right-side collision acceleration sensor 11, the microcomputer 12 recognizes the acceleration from the electric signal, and when the acceleration exceeds the impact acceleration, it recognizes the right side collision, and outputs the control signal to close the semiconductor switch 19.

Likewise, receiving the detection signal from the right-side collision acceleration sensor 16, the microcomputer 18 recognizes the right side collision, and outputs the control signal to close the semiconductor switch 21.

Thus, the power supply 15 supplies a current to the driving circuit 23 through the semiconductor switches 19 and 21, so that the driving circuit 23 drives the occupant protection system 24 against the right-side crashes.

On the other hand, when another vehicle collides with the left side in the traveling direction of the vehicle, the left-side collision acceleration sensor 13 supplies the microcomputer 14 with the electric signal proportional to the acceleration applied on the left side of the vehicle. In addition, the left-side collision acceleration sensor 17 detects the impact acceleration beyond the reference acceleration, and supplies the detection signal to the microcomputer 18.

Receiving electric signal from the left-side collision acceleration sensor 13, the microcomputer 14 recognizes the acceleration from the electric signal, and when the acceleration exceeds the impact acceleration, it recognizes the left side collision, and outputs the control signal to close the semiconductor switch 20.

Likewise, receiving the detection signal from the left-side collision acceleration sensor 17, the microcomputer 18 recognizes the left side collision, and outputs the control signal to close the semiconductor switch 22.

Thus, the power supply 15 supplies a current to the driving circuit 25 through the semiconductor switches 20 and 22, so that the driving circuit 25 drives the occupant protection system 26 against the left-side crashes.

FIG. 21 is a plan view showing a conventional acceleration detector (right-side collision acceleration sensor 16 or left-side collision acceleration sensor 17) disclosed in Japanese patent application laid-open No. 9-211023/1997, for example. In this figure, the reference numeral 31 designates a weight; 32 designates a shaft on which the weight 31 slides when the weight 31 undergoes an inertial force by the crash of the vehicle; 33 designates a spring; 34 designates a moving contact; and 35 designates a fixed contact.

As clearly shown in FIG. 21, the conventional acceleration detector has its fixed contact 35 and moving contact 34 separated apart in a normal mode where no collision takes place.

If the weight 31 undergoes a large inertial force beyond the force of the spring 33 by the collision of the vehicle, it moves to the left in FIG. 21, so that the moving contact 34 comes into contact with the fixed contact 35.

Thus, when the fixed contact 35 makes contact with the moving contact 34, the acceleration detector 16 or 17 supplies the detection signal to the microcomputer 18.

With the foregoing arrangement, it is necessary for the conventional acceleration detector 16 or 17 to have the fixed contact 35 and moving contact 34 disposed in such a manner that they are spaced by a rather large distance so that they do not come to contact with each other in the normal mode. The rather large distance between the fixed contact 35 and moving contact 34 offers a problem of reducing the response sensitivity to the impact acceleration.

In addition, it has another problem in that the detection direction of the impact acceleration is limited to one direction.

SUMMARY OF THE INVENTION

The present invention is implemented to solve the foregoing problems. It is therefore an object of the present invention to provide an acceleration detector capable of improving the response sensitivity to the impact acceleration.

Another object of the present invention is to provide an acceleration detector capable of detecting the impact acceleration bidirectionally.

According to a first aspect of the present invention, there is provided an acceleration detector including a mass member making contact with a fixed contact; and an elastic member that presses the mass member to the fixed contact, wherein when the mass member moves toward the elastic member by an inertial force exceeding a pushing force of the elastic member, a conducting state between the mass member and the fixed contact is broken. Thus, it offers an advantage of being able to improve the response sensitivity to the impact acceleration.

Here, the fixed contact may include a plurality of fixed contacts, and the mass member may be composed of a conductive material, wherein when the mass member moves toward the elastic member, a conducting state between the plurality of fixed contacts may be broken. Thus, it offers an advantage of being able to improve the response sensitivity to the impact acceleration, without increasing the complexity in structure and the number of components.

The fixed contact, the mass member, and a fixed member may be arranged in this order, and the mass member may be composed of a conductive material, wherein when the mass member moves toward the elastic member, a conducting state between the fixed contact and the fixed member may be broken.

According to a second aspect of the present invention, there is provided an acceleration detector including; first and second mass members making contact with first and second fixed contacts, respectively; and an elastic member that presses these mass members to the first and second fixed contacts, wherein when at least one of the mass members moves toward the elastic member by an inertial force exceeding a pushing force of the elastic member, the mass member that moves breaks its contact with one of the fixed contacts that kept contact with it. Thus, it offers an advantage of being able to improve the response sensitivity to the impact acceleration, and to detect the impact acceleration in both directions.

Here, the first and second mass members may be composed of a conductive material, wherein when at least one of them moves toward the elastic member, the conducting state between the two fixed contacts may be broken. Thus, it offers an advantage of being able to improve the response sensitivity to the impact acceleration, without increasing the complexity in structure and the number of components.

At least one of the fixed contacts may be composed of a plurality of fixed contacts. This makes it possible to detect an abnormal input such as radio noise, thereby offering an advantage of being able to prevent erroneous driving of the occupant protection system.

The mass member may consist of a part of the elastic member. This offers an advantage of being able to increase the efficiency of the assembly, and to fabricate the acceleration detector at lower cost.

The first and second mass members may make contact with each other before the elastic member reaches its elastic yield point. This offers an advantage of being able to increase the reliability of the acceleration detector.

At least one of the fixed contacts may have an elastic structure that alters its shape in response to the pushing force of the elastic member. Thus, the acceleration detector can prevent unexpected disconnection by large, short impact acceleration such as hammering, thereby offering an advantage of being able to achieve stable operation.

The first and second mass members may have different inertial masses. This enables the acceleration detector to be mounted at various places on the vehicle.

When a non-conducting state between the mass member and the fixed contact is detected, the acceleration detector may drive an occupant protection system. This offers an advantage of being able to protect the occupants at a crash.

The mass member may be allowed to move when the vehicle undergoes side-to-side acceleration. This offers an advantage of being able to detect a side collision.

Thee mass member may be allowed to move when the vehicle undergoes back-and-forth acceleration. This offers an advantage of being able to detect a frontal or rear collision.

BRIEF DESCRIPTION OF THE DRAWINGS

FIG. 4 is a circuit diagram showing a connection of the side collision acceleration sensor to a microcomputer;

FIG. 5 is a diagram illustrating changes in impact acceleration and in a semiconductor switch;

FIG. 6 is another diagram illustrating changes in the impact acceleration and in the semiconductor switch;

FIG. 10 is a table showing the states of mass members and fixed contacts, and the control states of semiconductor switches in the embodiment 2 of FIG. 9;

FIG. 13 is a table showing states of the mass members and fixed contacts, and the control states of semiconductor switches in the embodiment 3 of FIG. 12;

DETAILED DESCRIPTION OF THE PREFERRED EMBODIMENTS

The invention will now be described with reference to the accompanying drawings.

Embodiment 1

Figure 1:
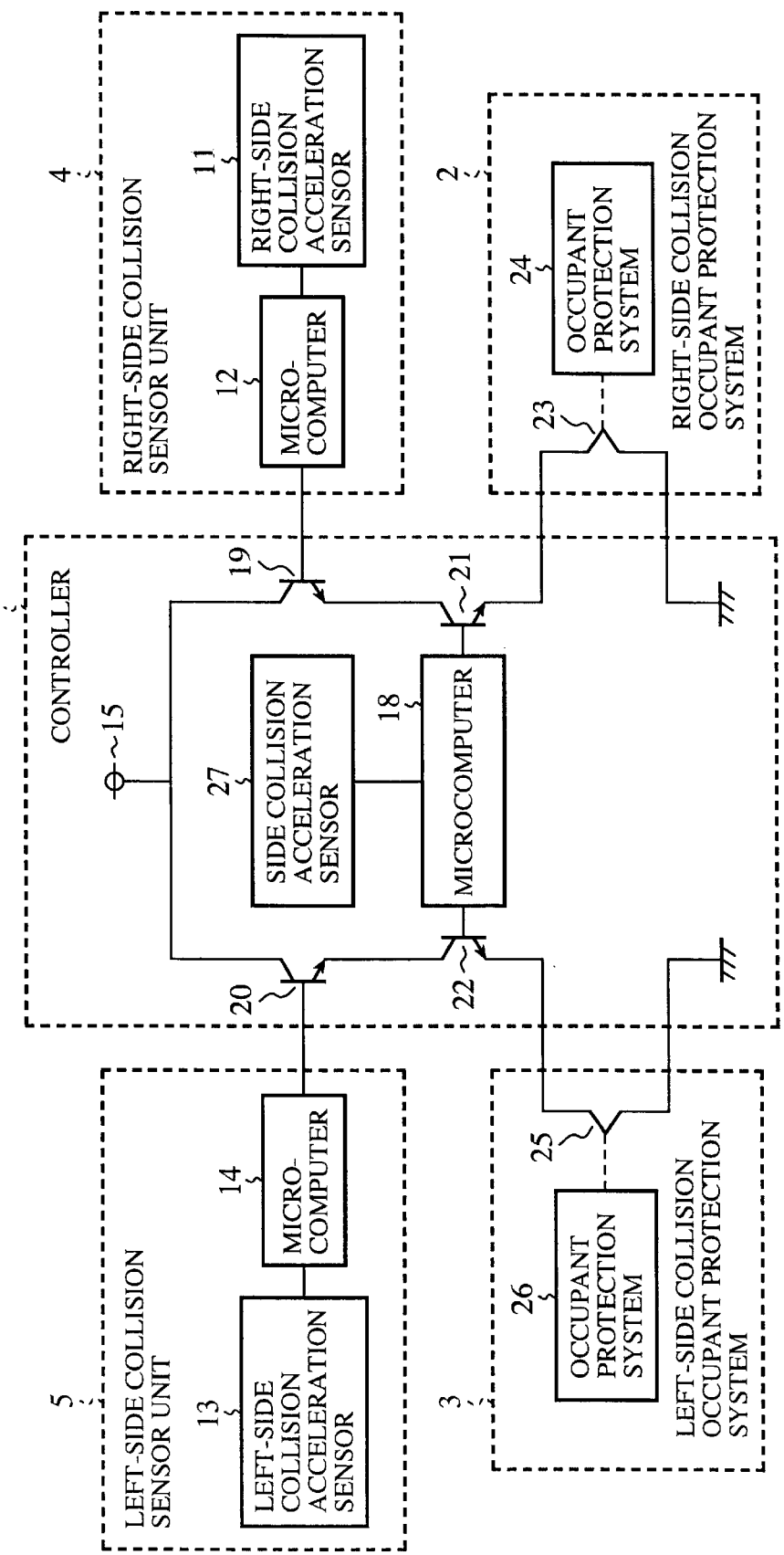
FIG. 1 is a block diagram showing an electrical configuration of an occupant protection system to which an embodiment 1 of the acceleration detector in accordance with the present invention is applied.

FIG. 1 is a block diagram showing an electrical configuration of an occupant protection system to which an embodiment 1 of the acceleration detector in accordance with the present invention is applied. In this figure, the reference numeral 11 designates a semiconductor type right-side collision acceleration sensor for producing an electric signal proportional to the acceleration the vehicle undergoes on the right side in its traveling direction; and 12 designates a microcomputer that recognizes the acceleration from the electric signal supplied from the right-side collision acceleration sensor 11, and outputs a control signal for closing a semiconductor switch 19 when the acceleration exceeds impact acceleration (acceleration beyond reference acceleration). Likewise, the reference numeral 13 designates a semiconductor type left-side collision acceleration sensor for producing an electric signal proportional to the acceleration the vehicle undergoes on the left side in its traveling direction; and 14 designates a microcomputer that recognizes the acceleration from the electric signal supplied from the left-side collision acceleration sensor 13, and outputs a control signal for closing a semiconductor switch 20 when the acceleration exceeds the impact acceleration.

The reference numeral 15 designates a power supply; and 27 designates a mechanical side collision acceleration sensor that is mounted inside the controller 6 for detecting the impact acceleration the vehicle undergoes on the right side and the left side in its traveling direction. The reference numeral 18 designates a microcomputer that outputs a control signal for closing a semiconductor switch 21 when the side collision acceleration sensor 27 detects the impact acceleration the vehicle undergoes on the right side, and that outputs a control signal for closing a semiconductor switch 22 when the side collision acceleration sensor 27 detects the impact acceleration the vehicle undergoes on the left side. Reference numerals 19–22 each designate a semiconductor switch. The reference numeral 23 designates a driving circuit for driving an occupant protection system 24 when the semiconductor switches 19 and 21 are closed; and 24 designates the occupant protection system such as an air bag against right-side crashes. Likewise, the reference numeral 25 designates a driving circuit for driving an occupant protection system 26 when the semiconductor switches 20 and 22 are closed; and 26 designates the occupant protection system such as an air bag against left-side crashes.

Figure 2A:
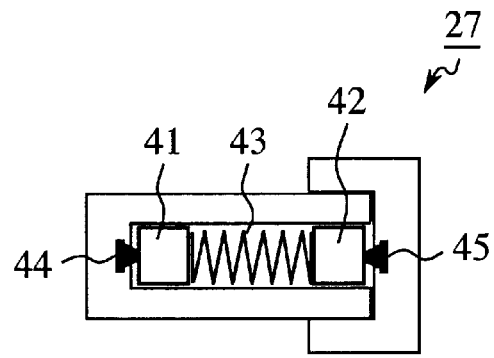
FIG. 2A is a plan view showing a side collision acceleration sensor.
Figure 2B:
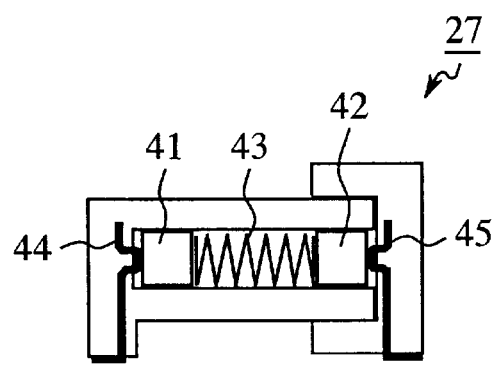
FIG. 2B is a side view showing the side collision acceleration sensor.

FIG. 2A is a plan view showing the side collision acceleration sensor 27, and FIG. 2B is a side view thereof. In these figures, the reference numeral 41 designates a mass member for detecting the impact acceleration (deceleration of the vehicle) the vehicle undergoes on the right side in its traveling direction at the side collision. The mass member 41 has its first end made contact with a fixed contact 44. The reference numeral 42 designates a mass member for detecting the impact acceleration the vehicle undergoes on the left side in its traveling direction at the side collision. The mass member 42 has its first end made contact with a fixed contact 45. The reference numeral 43 designates an elastic member that has its first end made contact with the second end of the mass member 41, and its second end made contact with the second end of the mass member 42, and that pushes the mass members 41 and 42 toward the fixed contacts 44 and 45. The reference numeral 44 designates the fixed contact making contact with the first end of the mass member 41 by the pushing force of the elastic member 43; and 45 designates the fixed contact making contact with the first end of the mass member 42 by the pushing force of the elastic member 43.

It is assumed the present embodiment 1 that the mass member 41 is mounted on the left side and the mass member 42 is mounted on the right side in the traveling direction of the vehicle.

It is further assumed that in the normal driving mode, the mass members 41 and 42 keep contact with the fixed contacts 44 and 45 by the pushing force of the elastic member 43, respectively, because the impact on the acceleration detector is small in the normal driving mode.

Moreover, it is assumed that the elastic member 43 is composed of a conductive material such as a stainless steel, and the mass members 41 and 42 are composed of a conductive material such as an aluminum die-cast metal or copper. Thus, in the normal driving mode, the fixed contacts 44 and 45 are conducting through the mass member 41, elastic member 43 and mass member 42.

Next, the operation of the present embodiment 1 will be described.

Figure 3:
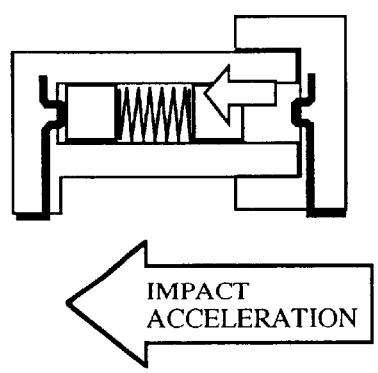
FIG. 3 is a side view illustrating movement of a mass member of the side collision acceleration sensor.

For example, the mass member 42 undergoes strong inertial force when another vehicle collides with the left side of the vehicle. When the inertial force exceeds the pushing force of the elastic member 43, the mass member 42 moves toward the elastic member 43 as shown in FIG. 3.

This will separate the mass member 42 from the fixed contact 45, thereby breaking the connection between the fixed contacts 44 and 45.

On the other hand, when a vehicle collides with the right side of the vehicle, the mass member 41 undergoes strong inertial force. When the inertial force exceeds the pushing force of the elastic member 43, the mass member 41 moves toward the elastic member 43.

This will separate the mass member 41 from the fixed contact 44, thereby breaking the connection between the fixed contacts 44 and 45.

Therefore, although the fixed contacts 44 and 45 are electrically continuous in the normal driving mode, they are brought out of conduction when the vehicle experiences a collision that will apply a considerable impact on the left or right side of the vehicle.

Accordingly, the microcomputer 18 can detect the level of the impact on the acceleration detector by monitoring the continuity or discontinuity between the fixed contacts. In this case, the reference level of the impact is controllable by adjusting the force of the elastic member 43 and the mass of the mass members 41 and 42 in advance.

FIG. 4 is a circuit diagram showing a connection of the side collision acceleration sensor 27 to the microcomputer 18. In this figure, the reference numeral 28 designates a resistor for adjusting the input voltage to the microcomputer 18.

When the side collision acceleration sensor 27 is conducting in the circuit configuration as shown in FIG. 4, a fixed voltage is applied to the microcomputer (high voltage state), whereas when it is out of conduction, the input voltage becomes zero (low voltage state).

Thus, in the normal driving mode in which the impact acceleration is less than the activating acceleration (the value obtained by dividing the pushing force of the elastic member 43 by the mass of the mass member 41 or 42), the microcomputer 18 is supplied with the high voltage as illustrated in FIG. 5. In contrast, when the impact acceleration exceeds the activating acceleration, the microcomputer 18 is supplied with the low voltage as illustrated in FIG. 6. Accordingly, the microcomputer 18 can detect the continuity between the fixed contacts 44 and 45 by monitoring the voltage variations.

Next, the operation of the occupant protection system will be described.

For example, when another vehicle collides with the right side in the traveling direction of the vehicle, the right-side collision acceleration sensor 11 supplies the microcomputer 12 with the electric signal proportional to the acceleration the vehicle undergoes on the right side in its traveling direction. At the same time, the side collision acceleration sensor 27 detects the impact acceleration exceeding the reference acceleration, and supplies the detection signal (low voltage of zero) to the microcomputer 18.

Receiving the electric signal from the right-side collision acceleration sensor 11, the microcomputer 12 recognizes the acceleration from the electric signal, and when the acceleration exceeds the impact acceleration, it recognizes the right side collision, and outputs the control signal for closing the semiconductor switch 19.

On the other hand, the microcomputer 18, receiving the detection signal from the side collision acceleration sensor 27, recognizes the right side collision, and outputs the control signal for closing the semiconductor switch 21.

Thus, the power supply 15 supplies a current to the driving circuit 23 through the semiconductor switches 19 and 21, so that the driving circuit 23 drives the occupant protection system 24 against the right-side crash.

On the other hand, when another vehicle collides with the left side in the traveling direction of the vehicle, the left-side collision acceleration sensor 13 supplies the microcomputer 14 with the electric signal proportional to the acceleration the vehicle undergoes on the left side in its traveling direction. At the same time, the side collision acceleration sensor 27 detects the impact acceleration exceeding the reference acceleration, and supplies the detection signal (low voltage of zero) to the microcomputer 18.

Receiving the electric signal from the left-side collision acceleration sensor 13, the microcomputer 14 recognizes the acceleration from the electric signal, and when the acceleration exceeds the impact acceleration, it recognizes the left side collision, and outputs the control signal for closing the semiconductor switch 20.

On the other hand, the microcomputer 18, receiving the detection signal from the side collision acceleration sensor 27, recognizes the left side collision, and outputs the control signal for closing the semiconductor switch 22.

Thus, the power supply 15 supplies a current to the driving circuit 25 through the semiconductor switches 20 and 22, so that the driving circuit 25 drives the occupant protection system 26 against the left-side crash.

As described above, the present embodiment 1 is configured such that when the mass member 42 is moved toward the fixed contact 44 by the inertial force exceeding the pushing force of the elastic member 43, which is caused by the impact on the left side in the traveling direction of the vehicle, the mass member 42 breaks the contact with the fixed contact 45, and that when the mass member 41 is moved toward the fixed contact 45 by the inertial force exceeding the pushing force of the elastic member 43, which is caused by the impact on the right side in the traveling direction of the vehicle, the mass member 41 breaks the contact with the fixed contact 44. As a result, it is not necessary for the present embodiment 1 to maintain the distance between the moving contact and the fixed contact as in the conventional system in the normal driving mode. Therefore, the present embodiment 1 offers an advantage of being able to improve the response sensitivity to the impact acceleration.

In addition, it offers an advantage of being able to detect the impact acceleration in both directions.

Figure 7:
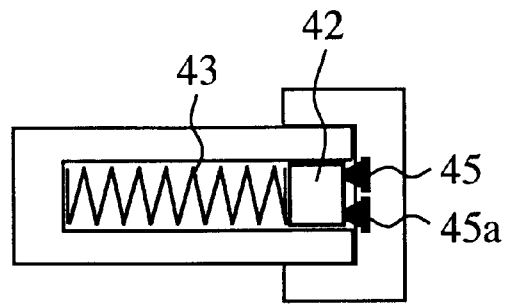
FIG. 7 is a plan view showing a side collision acceleration sensor.
Figure 8:
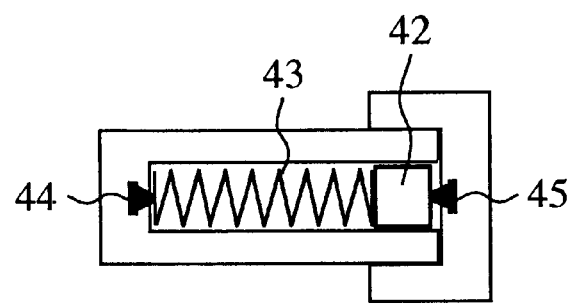
FIG. 8 is a plan view showing another side collision acceleration sensor.

Although the side collision acceleration sensor 27 can detect the impact acceleration in both directions in the present embodiment 1, when the impact acceleration detection in only one direction is required, the side collision acceleration sensor 27 can be configured as shown in FIG. 7 or 8. Here, the reference numeral 45a in FIG. 7 designates a second fixed contact.

As for the side collision acceleration sensor 27 as shown in FIG. 7 or 8, although the detection of the impact acceleration is limited to one direction, it has an advantage of being able to improve the response sensitivity to the impact acceleration just as the side collision acceleration sensor 27 as shown in FIG. 2.

Embodiment 2

Figure 9:
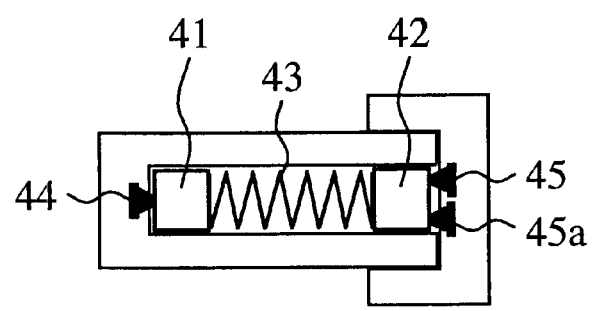
FIG. 9 is a plan view showing an embodiment 2 of the acceleration detector in accordance with the present invention.

FIG. 9 is a plan view showing an embodiment 2 of the acceleration detector in accordance with the present invention. In this figure, the same reference numerals designate the same or like portions to those of FIGS. 2 and 7, and the description thereof it omitted here.

It is assumed in the present embodiment 2 that the mass member 41 keeps contact with the fixed contact 44 by the pushing force of the elastic member 43, and the mass member 42 keeps contact with the fixed contacts 45 and 45a by the pushing force of the elastic member 43 in the normal driving mode, because of the small impact on the acceleration detector.

In addition, in the normal driving mode, the fixed contacts 44 and 45, and 44 and 45a, are electrically continuous through the mass member 41, elastic member 43 and mass member 42.

Next, the operation of the present embodiment 2 will be described.

For example, the mass member 42 undergoes strong inertial force when another vehicle collides with the left side of the vehicle. When the inertial force exceeds the pushing force of the elastic member 43, the mass member 42 moves toward the elastic member 43.

This will separate the mass member 42 from the fixed contact 45, and isolates the fixed contacts 45 and 45a, thereby breaking the connection between the fixed contacts 44 and 45, and 44 and 45a.

On the other hand, the mass member 41 undergoes strong inertial force when another vehicle collides with the right side of the vehicle. When the inertial force exceeds the pushing force of the elastic member 43, the mass member 41 moves toward the elastic member 43.

This will separate the mass member 41 from the fixed contact 44, thereby breaking the connection between the fixed contacts 44 and 45. In this case, however, the fixed contacts 45 and 45a keeps the conducting state.

In the course of the collision, the vehicle can undergo the impact on the right and left side alternately. When the inertial force of the mass member 41 exceeds the pushing force of the elastic member 43, and the inertial force of the mass member 42 exceeds the pushing force of the elastic member 43, the mass member 41 separates from the fixed contact 44, and the mass member 42 from the fixed contacts 45 and 45a.

In this case, all the fixed contacts 44, 45 and 45a are isolated.

FIG. 10 is a table showing the state of the mass members 41 and 42, the state of the fixed contacts (the input to the microcomputer 18), and the control of the semiconductor switches 21 and 22.

For example, when the mass member 41 moves, but the mass member 42 does not, the fixed contact 44 is disconnected from the fixed contacts 45 and 45a, but the fixed contacts 45 and 45a keep the conducting state.

In this case, the microcomputer 18 closes the semiconductor switch 21 connected to the driving circuit 23 of the occupant protection system 24 against the right-side crashes, and opens the semiconductor switch 22 connected to the driving circuit 25 of the occupant protection system 26 against the left-side crashes.

FIG. 11 is a timing chart illustrating the control in the actual collision.

Figure 11A:
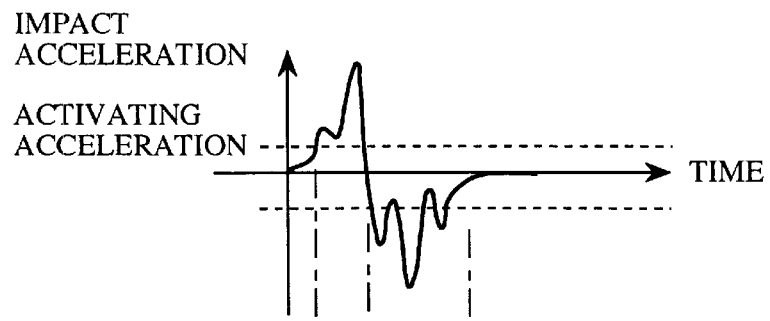
FIG. 11 is a timing chart illustrating the control of the embodiment 2 during an actual crash.
Figure 11B:
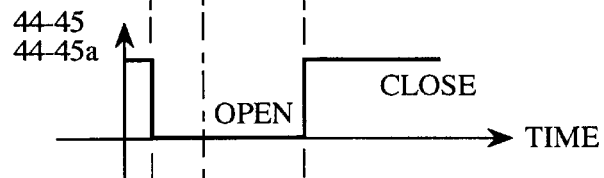
Figure 11C:

In this figure, the horizontal axis represents the elapsed time from the occurrence of the collision, and the vertical axis represents the following: In FIG. 11(a), the vertical axis represents the impact acceleration, where positive axis represents the impact acceleration on the right side of the vehicle; in FIG. 11(b), it represents the conducting state between the fixed contacts 44 and 45 when the impact acceleration is input, which is the same as that between the fixed contacts 44 and 45a; in FIG. 11(c), it represents the conducting state between the fixed contacts 45 and 45a; in FIG. 11(d), it represents the state of the semiconductor switch 21; and FIG. 11(e) represents the state of the semiconductor switch 22

Consider the case where the impact acceleration as illustrated in FIG. 11(a) is input because of the collision of the vehicle. When the impact acceleration is zero, the conducting state between the fixed contacts 44 and 45, that between the fixed contacts 44 and 45a, and that between the fixed contacts 45 and 45a are all established.

Afterward, when positive (right direction) impact acceleration increases to such a level as moving the mass member 41, the mass member 41 separates from the fixed contact 44. Thus, the conducting state between the fixed contacts 44 and 45, and that between the fixed contacts 44 and 45a are broken. In contrast, the conducting state between the fixed contacts 45 and 45a is maintained.

Figure 11D:
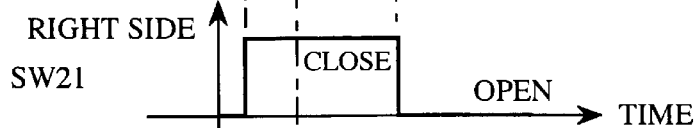
Figure 11E:
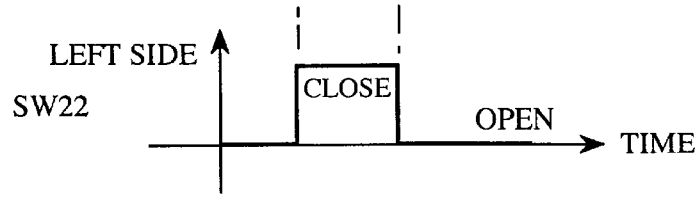

In this case, the microcomputer 18 controls the semiconductor switches 21 and 22 such that the semiconductor switch 21 is closed and the semiconductor switch 22 is opened as illustrated in FIGS. 11(d) and 11(e).

Subsequently, when negative (left direction) impact acceleration reduces to such a level as moving the mass member 42, the mass member 42 separates from the fixed contacts 45 and 45a while the mass member 41 maintains the separated state from the fixed contact 44. In this case, the state between the fixed contacts 44 and 45, that between the fixed contacts 44 and 45a, and that between the fixed contacts 45 and 45a are all brought into a non-conducting state.

In this case, the microcomputer 18 brings the semiconductor switches 21 and 22 into closed state as illustrated in FIGS. 11(d) and 11(e).

Afterward, when the magnitude of the impact acceleration becomes smaller, the mass member 41 returns to its initial position by the pushing force of the elastic member 43, thereby making contact with the fixed contact 44. Subsequently, the mass member 42 returns to its initial position, thereby making contact with the fixed contacts 45 and 45a. Thus, the state between the fixed contacts 44 and 45, that between the fixed contacts 44 and 45a, and that between the fixed contacts 45 and 45a are all brought into a conducting state.

In this case, the microcomputer 18 opens the semiconductor switches 21 and 22 as illustrated in FIGS. 11(d) and 11(e).

Thus, the microcomputer 18 controls the semiconductor switches 21 and 22 in response to the state of the fixed contacts. When the semiconductor switch 22 is closed while the semiconductor switch 20 is closed, the driving current flows into the occupant protection system 26 against the left-side crashes, thereby driving the occupant protection system 26. When the semiconductor switch 21 is closed while the semiconductor switch 19 is closed, the driving current flows into the occupant protection system 24 against the right-side crashes, thereby driving the occupant protection system 24.

With the foregoing arrangement and control, the acceleration detector can control the right and left occupant protection systems independently in part. In addition, when any one of the states of the fixed contacts that have no corresponding states of the mass members is input as shown in FIG. 10, it is recognized as the abnormal inputs such as radio noise, thereby being able to prevent the erroneous driving of the occupant protection system. This enables processing for the abnormal operation such as turning on an alarm lamp on the panel of the vehicle (not shown).

Embodiment 3

Figure 12:
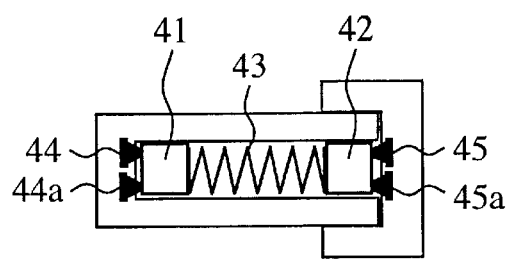
FIG. 12 is a plan view showing an embodiment 3 of the acceleration detector in accordance with the present invention.
Figure 14A:
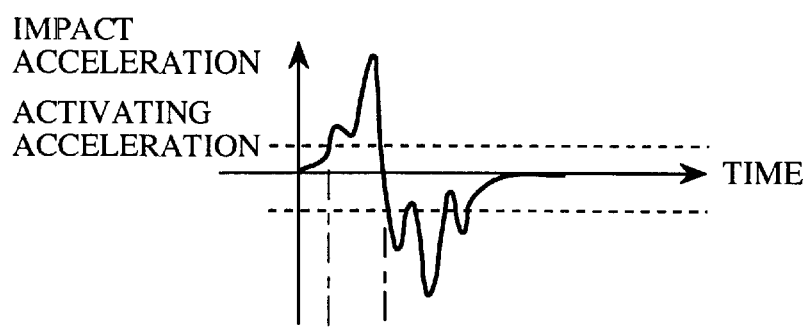
FIG. 14 is a timing chart illustrating the control of the embodiment 3 during an actual crash.
Figure 14B:
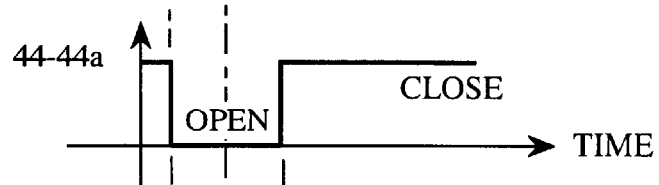
Figure 14C:
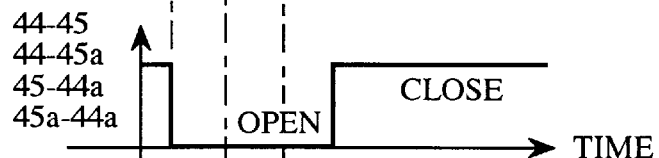
Figure 14D:
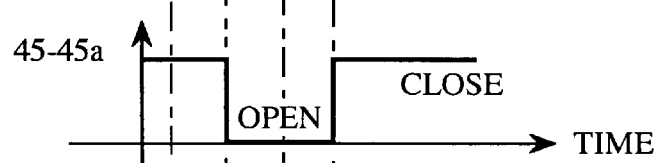
Figure 14E:
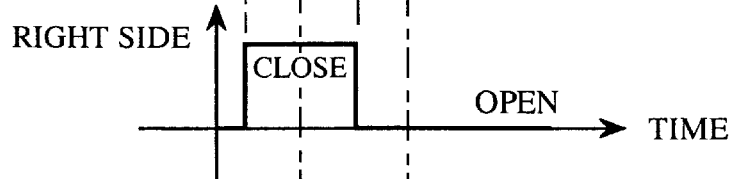
Figure 14F:
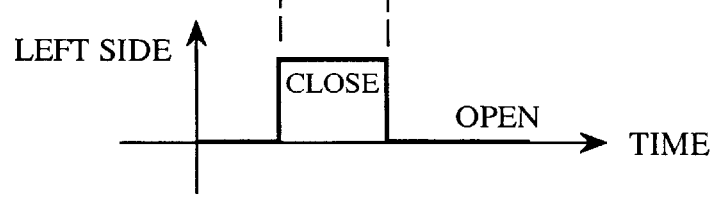

Although the foregoing embodiment 2 comprises in addition to the fixed contact 45 the fixed contact 45a that makes contact with the mass member 42, the present embodiment 3 further comprises in addition to the fixed contact 44 a fixed contact 44a that makes contact with the first end of the mass member 41 as shown in FIG. 12.

In this case, similar advantages to those of the foregoing embodiment 2 can be achieved.

FIG. 13 is a table showing the state of the mass members 41 and 42, the conducting state between the fixed contacts (input to the microcomputer 18), and the control of the semiconductor switches 21 and 22. FIG. 14 is a timing chart illustrating the control at an actual collision.

As shown in FIG. 13, only four patterns among the total of 64 patterns of the fixed contacts are allowed as the normal input to the microcomputer 18 in the present embodiment 3. Accordingly, the present embodiment 3 can identify the normal/abnormal state at a probability of 93.75% for incoming random noise, thereby being able to make more accurate decision than the foregoing embodiment 2.

Embodiment 4

Figure 15:
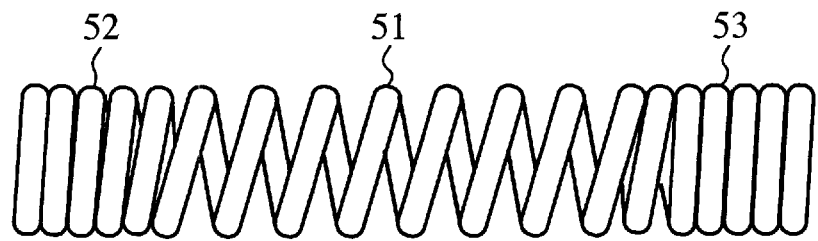
FIG. 15 is a plan view showing an elastic member and mass members of an embodiment 4 of the acceleration detector in accordance with the present invention, which are formed in one body.

Although the mass members 41 and 42 are formed separately from the elastic member 43 in the foregoing embodiments 1–3, the mass members may each be formed as an integral part of the elastic member as shown in FIG. 15.

Specifically, in the example of FIG. 15, a coil spring 51 is used as the elastic member 43, with its coil end 52 being used as the mass member 41, and its coil end 53 as the mass member 42.

Thus, the present embodiment 4 can fabricate the acceleration detector with a smaller number of parts, thereby making it possible to improve the efficiency of the assembly, and to reduce the cost.

Embodiment 5

Figure 16A:
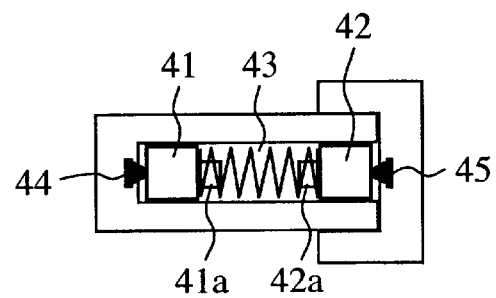
FIG. 16A is a plan view showing an embodiment 5 of an acceleration detector in accordance with the present invention.
Figure 16B:
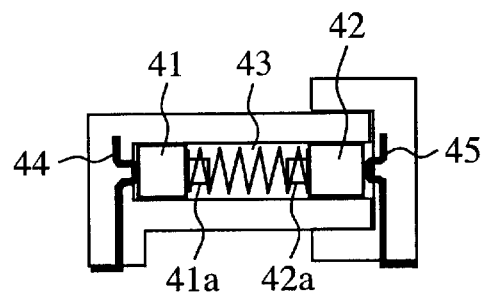
FIG. 16B is a side view showing the embodiment 5 of the acceleration detector.
Figure 17:
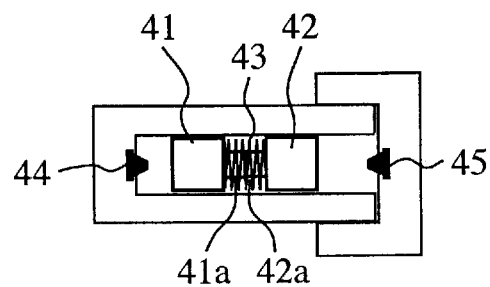
FIG. 17 is a plan view showing a state of the embodiment 5 of the acceleration detector at an occurrence of an impact.

Although no mention is made in the foregoing embodiments 1–4, the elastic member 43 can reach its elastic yield point during the movement of the mass members 41 and 42. To prevent this, the present embodiment 5 provides the mass members 41 and 42 with contacting portions 41a and 42a, respectively, as shown in FIGS. 16A and 16B, and FIG. 17, so that the mass members 41 and 42 strike each other before the elastic member 43 reaches the elastic yield point.

Thus, to prevent the elastic member 43 from reaching the elastic yield point and hence bringing about permanent strain during the movement of the mass member 41 or 42, the mass members 41 and 42 comprise the protruding contacting portions 41a and 42a, respectively. They can secure space between the mass members 41 and 42 when they collide with each other, so that the elastic member 43 does not shrink beyond a certain length.

As a result, the present embodiment 5 can offer the acceleration detector with reduced permanent deformation, thereby improving the reliability of the acceleration detector.

Embodiment 6

Although no mention is made in the foregoing embodiments 1–5, the fixed contacts 44 and 45 may have an elastic structure that can alter its shape in response to the pushing force of the elastic member 43 as shown in FIG. 18. In FIG. 18, reference numerals 44b and 45b each designate a fixed contact with an elastic structure.

Figure 18A:
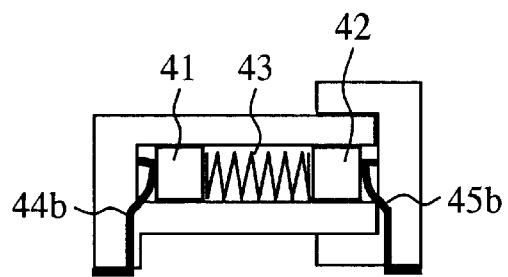
FIGS. 18(A)–18(C) are side views showing the operation of an embodiment 6 of the acceleration detector in accordance with the present invention.

As shown in FIG. 18(a), in the normal driving mode, the fixed contacts 44b and 45b keep contact with the end surfaces of the mass members 41 and 42 with deformed state by the pushing force of the elastic member 43. In this case, the fixed contacts 44b and 45b are electrically continuous.

Figure 18B:
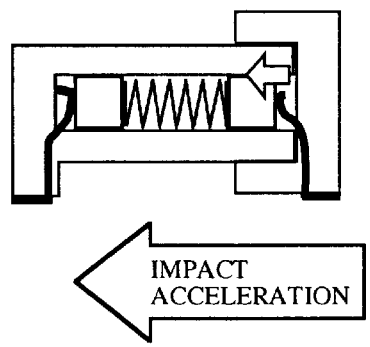

Afterward, when the impact acceleration is input from the left side of the vehicle, the mass member 42 moves toward the elastic member 43 as shown in FIG. 18(b). In this case, in spite of the movement, the mass member 42 keeps contact with the fixed contact 45b until the fixed contact 45b returns to its original form completely. Thus, the fixed contact 45b keeps contact with the fixed contact 44b for that time period.

If the impact is brief in duration, or the impact acceleration is small, the mass member 42 will move only a small amount. Accordingly, the fixed contact 45b returns to its normal state as shown FIG. 18(a) with keeping the conducting state with the fixed contact 44b.

Figure 18C:
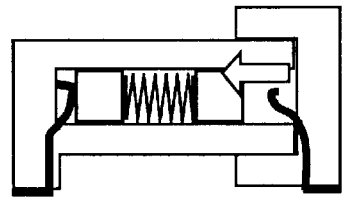
Figure 19:
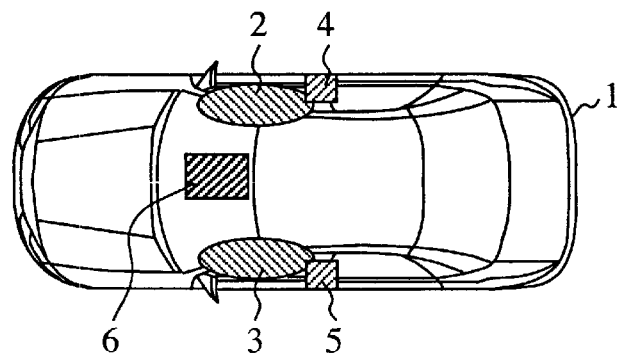
FIG. 19 is a top view showing a configuration of an occupant protection system such as an air bag system of a vehicle.
Figure 20:
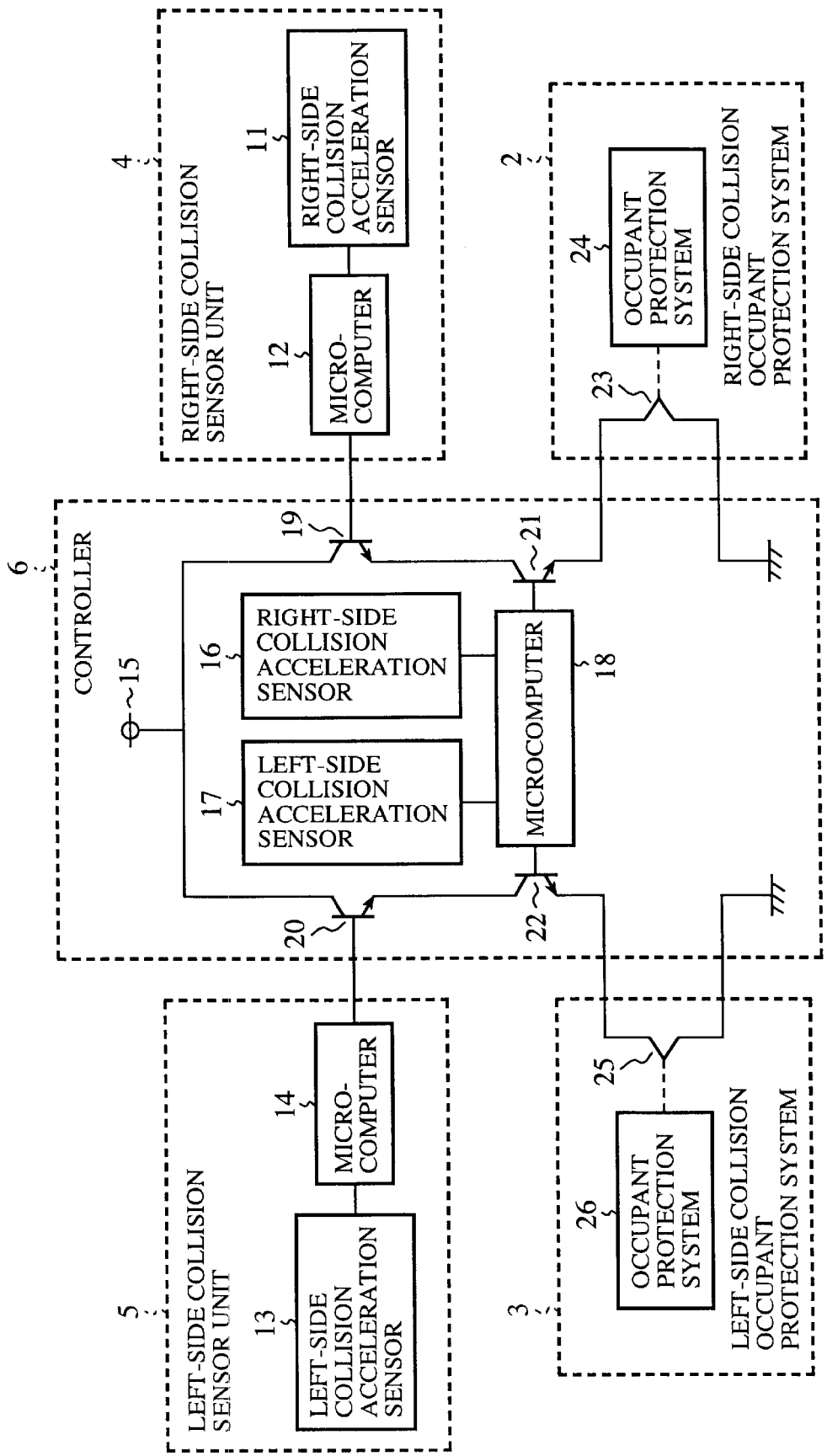
FIG. 20 is a block diagram showing an electrical configuration of a conventional occupant protection system.
Figure 21:
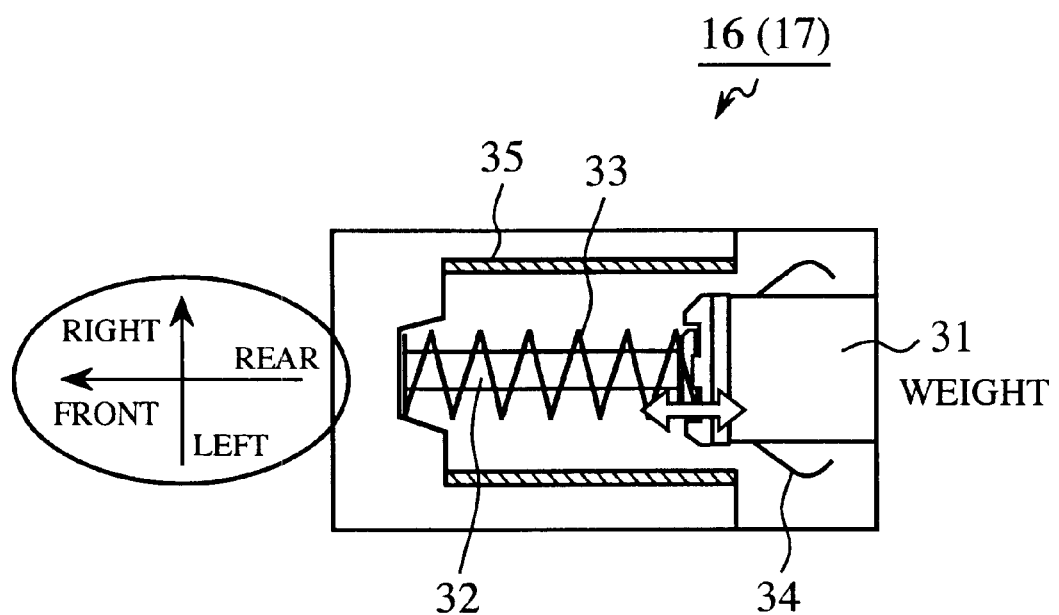
FIG. 21 is a cross-sectional view showing a conventional acceleration detector.

However, when an actual crash takes place, long duration, large magnitude impact acceleration is applied, so that the mass member 42 moves further toward the elastic member 43 as shown in FIG. 18(c). In this case, since the mass member 42 separates from the fixed contact 45b, the conducting state between the fixed contacts 44b and 45b is broken.

When the vehicle undergoes impact acceleration from its right side, although the moving direction of the mass member is reverse, the principle is the same. Accordingly, the description thereof it omitted here.

As described above, according to the present embodiment 6, the deformation amount of the fixed contacts 44b and 45b is adjusted in order to prevent an accidental break of the conducting state between the mass members and the fixed contacts, even if short duration, large magnitude impact acceleration such as hammering is applied.

Embodiment 7

Although no mention is made in the foregoing embodiments 1–6, the mass members 41 and 42 can have different inertial mass.

This makes it possible to adjust the sensitivity even when the acceleration detector is mounted in such a place as an asymmetric impact is expected to be applied in a collision, thereby enabling such control as canceling out the asymmetry. Therefore, the acceleration detector can be mounted in a broader variety of places.

Embodiment 8

Although the side collision acceleration sensor 27 is mounted on the vehicle such that the mass members 41 and 42 move when the vehicle undergoes the acceleration from side to side in the foregoing embodiments 1–7, this is not essential. For example, the side collision acceleration sensor 27 can be mounted on the vehicle such that the mass members 41 and 42 move when the forward or backward acceleration is applied to the vehicle.

What is claimed is:

1. An acceleration detector for detecting acceleration exceeding a reference acceleration, said acceleration detector comprising:
   a fixed contact;
   a mass member having its first end in contact with said fixed contact; and
   an elastic member that has its first end in contact with a second end of said mass member, and presses said mass member to said fixed contact, wherein
   when said mass member, undergoing an inertial force exceeding a force of said elastic member, moves toward said elastic member, a conducting state between said mass member and said fixed contact is broken, wherein said mass member is composed of a conductive material, and said fixed contact comprises a plurality of fixed contacts, a first end of each of which makes contact with said mass member, and wherein when said mass member moves toward said elastic member, a conducting state between said plurality of fixed contacts via said mass member is broken.

2. The acceleration detector according to claim 1, further comprising, in addition to said fixed contact making contact with the first end of said mass member, a fixed member having its end made contact with a second end of said elastic member, wherein said mass member is composed of a conductive material, and when said mass member moves toward said elastic member, a conducting state between said fixed contact and said fixed member via said mass member and said elastic member is broken.

3. An acceleration detector for detecting acceleration exceeding reference acceleration, said acceleration detector comprising:

a first fixed contact;

a second fixed contact;

a first mass member having its first end made contact with said first fixed contact;

a second mass member having its first end made contact with said second fixed contact; and an elastic member that has its first end made contact with a second end of said first mass member and its second end made contact with a second end of said second mass member, and that presses said first mass member to said first fixed contact and said second mass member to said second fixed contact, wherein when at least one of said first mass member and said second mass member, undergoing an inertial force exceeding a pushing force of said elastic member, moves toward said elastic member, said mass member that moves breaks its contact with one of said first fixed contact and said second fixed contact that kept contact with it.

4. The acceleration detector according to claim 3, wherein said first mass member and said second mass member are each composed of a conductive material, and wherein when at least one of said first mass member and said second mass member moves toward said elastic member, the conducting state between said first fixed contact and said second fixed contact via said first mass member, said elastic member and said second mass member is broken.

5. The acceleration detector according to claim 4, wherein at least one of said first fixed contact and said second fixed contact is composed of a plurality of fixed contacts.

6. The acceleration detector according to claim 1, wherein said mass member consists of a part of said elastic member.

7. The acceleration detector according to claim 3, wherein said first mass member and said second mass member consist of parts of said elastic member.

8. The acceleration detector according to claim 1, wherein said fixed contact has an elastic structure that alters its shape in response to the pushing force of said elastic member.

9. The acceleration detector according to claim 3, wherein at least one of said first fixed contact and said second fixed contact has an elastic structure that alters its shape in response to the pushing force of said elastic member.

10. The acceleration detector according to claim 3, wherein said first mass member and said second mass member have different inertial masses.

11. The acceleration detector according to claim 1, further comprising a controller for outputting a control signal that commands driving of an occupant protection system, when a non-conducting state between said mass member and said fixed contact is detected.

12. The acceleration detector according to claim 3, further comprising a controller for outputting a control signal that commands driving of an occupant protection system, when a non-conducting state between at least one of said fixed contacts and said fixed contact that kept contact with it is detected.

13. The acceleration detector according to claim 1, wherein said mass member, said elastic member and said fixed contact are arranged in a structure that allows said mass member to move when the vehicle undergoes side-to-side acceleration.

14. The acceleration detector according to claim 3, wherein said first mass member and said second mass member, said elastic member, and said first fixed contact and said second fixed contact are arranged in a structure that allows at least one of said first mass member and said second mass member to move when the vehicle undergoes side-to-side acceleration.

15. The acceleration detector according to claim 1, wherein said mass member, said elastic member and said fixed contact are arranged in a structure that allows said mass member to move when the vehicle undergoes back-and-forth acceleration.

16. The acceleration detector according to claim 3, wherein said first mass member and said second mass member, said elastic member, and said first fixed contact and said second fixed contact are arranged in a structure that allows at least one of said first mass member and said second mass member to move when the vehicle undergoes back-and-forth acceleration.

17. An acceleration detector for detecting acceleration exceeding a reference acceleration, said acceleration detector comprising:

a first fixed contact;

a second fixed contact;

a first mass member having its first end in contact with said first fixed contact;

a second mass member having its first end in contact with said second fixed contact; and an elastic member that has its first end made contact with a second end of said first mass member and its second end in contact with a second end of said second mass member, and that presses said first mass member to said first fixed contact and said second mass member to said second fixed contact, wherein when at least one of said first mass member and said second mass member, undergoing an inertial force exceeding a force of said elastic member, moves toward said elastic member, said mass member that moves breaks its contact with one of said first fixed contact and said second fixed contact, wherein said first mass member comprises a first contacting portion and said second mass member comprises a second contacting portion, said first and second contacting portions making contact with each other before said elastic member reaches its elastic yield point when at least one of said first mass member and said second mass member moves.

* * * * *